(12) United States Patent
Stevenson

(10) Patent No.: US 8,601,929 B2
(45) Date of Patent: Dec. 10, 2013

(54) INCENDIARY DISPENSING SYSTEM

(75) Inventor: Robert Andrew Stevenson, Nedlands (AU)

(73) Assignee: Raindance Systems Pty Ltd., Jandakot (AU)

( * ) Notice: Subject to any disclaimer, the term of this patent is extended or adjusted under 35 U.S.C. 154(b) by 415 days.

(21) Appl. No.: 12/741,699

(22) PCT Filed: Nov. 6, 2008

(86) PCT No.: PCT/AU2008/001647
§ 371 (c)(1),
(2), (4) Date: Sep. 16, 2010

(87) PCT Pub. No.: WO2009/059367
PCT Pub. Date: May 14, 2009

(65) Prior Publication Data
US 2010/0326263 A1    Dec. 30, 2010

(30) Foreign Application Priority Data
Nov. 6, 2007   (AU) .............................. 2007906117

(51) Int. Cl.
*B64D 1/04* (2006.01)
(52) U.S. Cl.
USPC ............................ 89/1.51; 102/364; 102/382
(58) Field of Classification Search
USPC ......... 89/1.51, 1.52, 1.54; 102/364, 336, 365, 102/335, 346; 169/45, 53, 36; 244/137.1
See application file for complete search history.

(56) References Cited

U.S. PATENT DOCUMENTS

| | | | | |
|---|---|---|---|---|
| 2,372,424 A | * | 3/1945 | Ironside | 242/597.3 |
| 2,646,786 A | * | 7/1953 | Robertson | 124/26 |
| 2,820,397 A | * | 1/1958 | Durkin | 89/1.51 |
| 2,979,991 A | * | 4/1961 | Buschers et al. | 89/1.7 |
| 3,547,000 A | * | 12/1970 | Haberkorn et al. | 89/1.51 |
| 3,584,581 A | * | 6/1971 | Flatau et al. | 102/387 |
| 4,494,440 A | * | 1/1985 | Koine | 89/33.04 |
| 4,833,966 A | * | 5/1989 | Maher et al. | 89/33.16 |
| 4,966,063 A | * | 10/1990 | Sanderson et al. | 89/37.22 |
| 5,062,543 A | * | 11/1991 | Germain | 221/30 |
| 5,253,574 A | * | 10/1993 | Sanderson | 89/34 |
| 5,263,397 A | * | 11/1993 | Sanderson | 89/37.22 |

(Continued)

FOREIGN PATENT DOCUMENTS

WO    WO 2004/041365    5/2004

OTHER PUBLICATIONS

International Search Report for Application No. PCT/AU2008/001647, dated Dec. 17, 1008, 2 pages.

*Primary Examiner* — Bret Hayes
*Assistant Examiner* — Joshua Freeman
(74) *Attorney, Agent, or Firm* — Fish & Richardson P.C.

(57) ABSTRACT

An incendiary dispensing system (10) comprises a casing (12), a supply (16) of incendiary capsules (18), an apparatus (14) for initiating and dispensing the incendiary capsules (18), and a loading mechanism (20). The casing (12) can be opened and closed to enable loading of the supply (16) of incendiary capsules (18). The casing (12) is provided with an aperture (22) to allow the dispensing of initiated capsules (18). The capsules (18) are formed as series connected belts (24). The loading mechanism (20) sequentially feeds the belts (24) to the apparatus (14) which initiates each incendiary and dispense the incendiary from the opening (22). The casing (12) is arranged for external mounting on an aircraft and may be ejected in the event of a malfunction.

28 Claims, 7 Drawing Sheets

(56) References Cited

U.S. PATENT DOCUMENTS

| | | | | |
|---|---|---|---|---|
| 5,267,501 | A * | 12/1993 | Shillig | 89/1.51 |
| 5,282,410 | A * | 2/1994 | Sanderson | 89/37.16 |
| 5,408,915 | A * | 4/1995 | Stoner | 89/33.14 |
| 5,905,224 | A * | 5/1999 | Jordan | 89/33.02 |
| 6,860,187 | B2 | 3/2005 | O'Dwyer | |
| 6,877,433 | B1 | 4/2005 | Stevenson | |
| 6,929,214 | B2 * | 8/2005 | Ackleson et al. | 244/1 R |
| 7,275,529 | B2 | 10/2007 | Boys | |
| 7,451,679 | B2 * | 11/2008 | Stevenson et al. | 89/1.51 |
| 2005/0066839 | A1 * | 3/2005 | Stevenson | 102/364 |
| 2006/0027380 | A1 * | 2/2006 | Stevenson et al. | 169/45 |
| 2007/0107592 | A1 * | 5/2007 | Snow | 89/33.02 |
| 2010/0101401 | A1 * | 4/2010 | Toeckes et al. | 89/1.51 |
| 2011/0005114 | A1 * | 1/2011 | Snow | 42/49.01 |
| 2012/0145830 | A1 * | 6/2012 | Stevenson et al. | 244/137.1 |

* cited by examiner

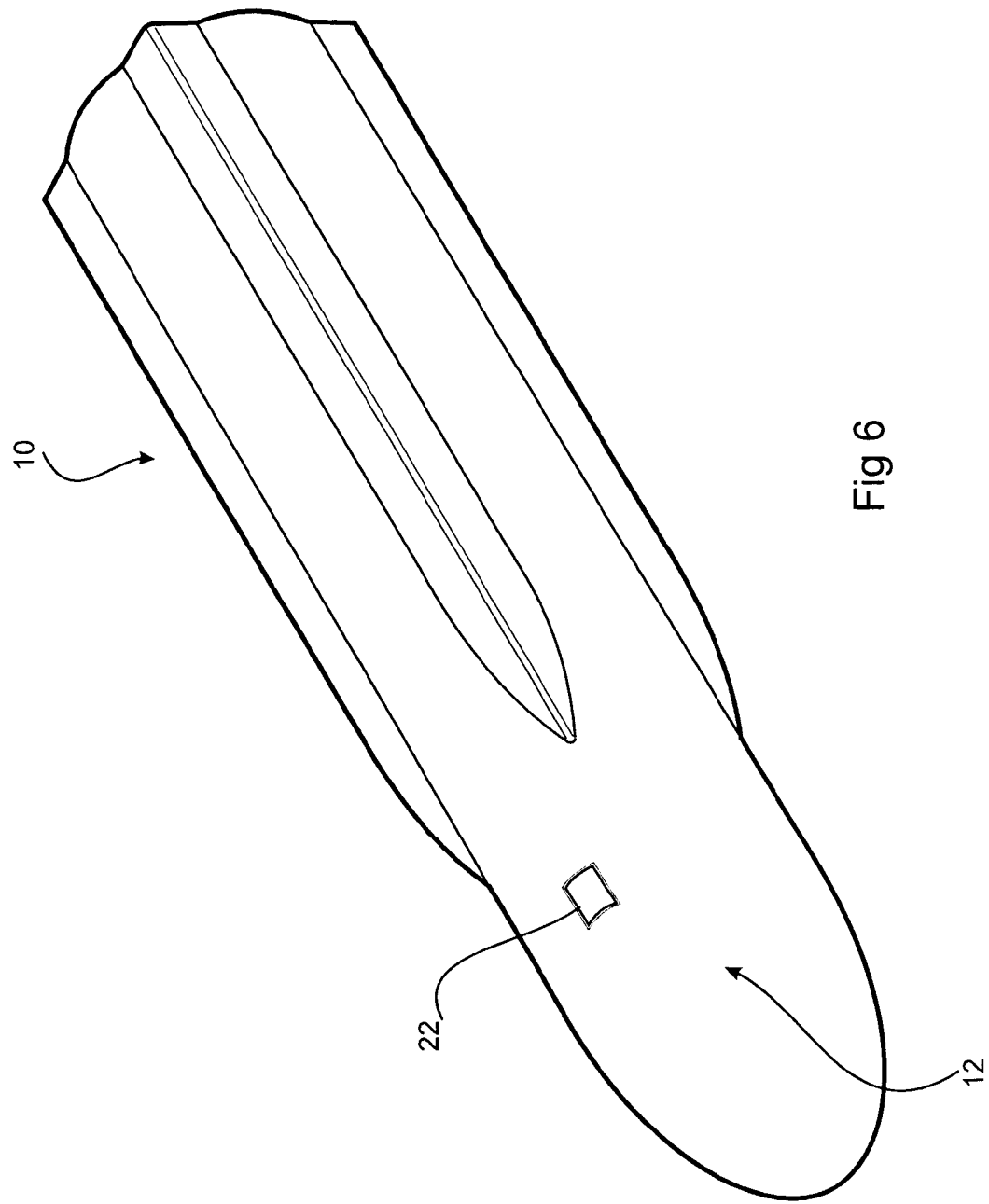

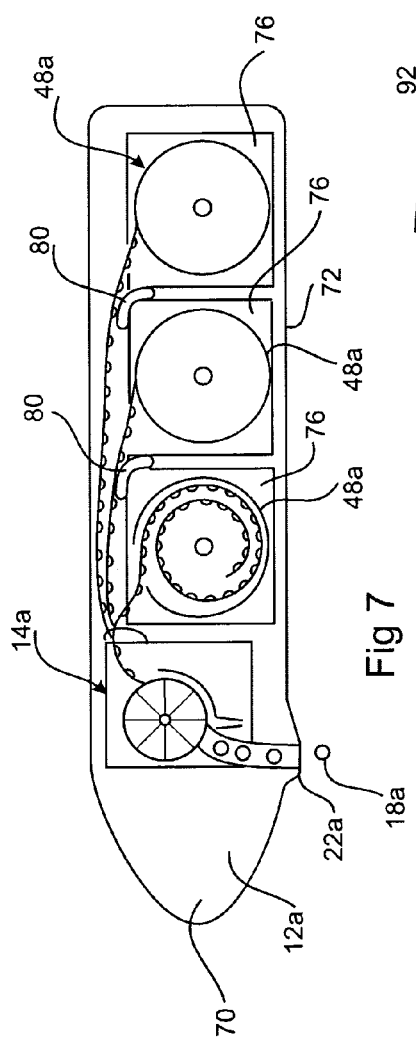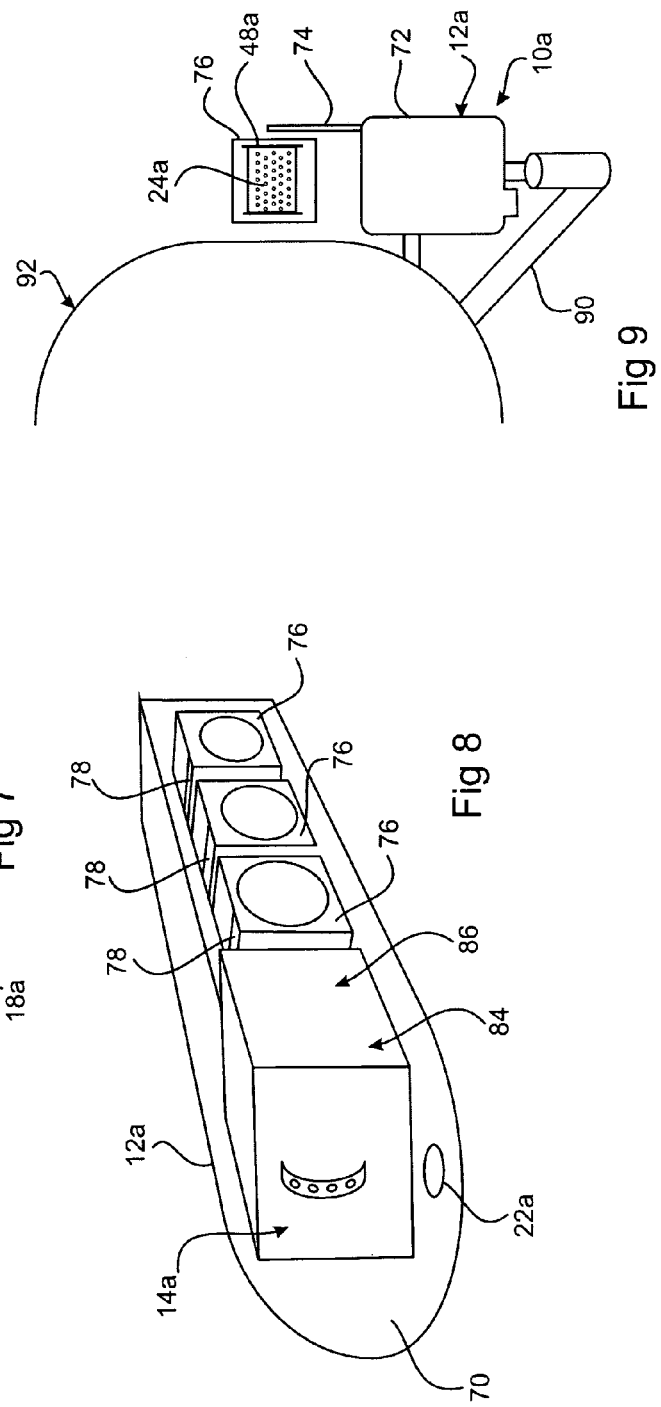

INCENDIARY DISPENSING SYSTEM

CROSS-REFERENCE TO RELATED APPLICATIONS

This application is a filing under 35 U.S.C. §371 and claims priority to international patent application number PCT/AU2008/001647 filed Nov. 6, 2008, published on May 14, 2009, which claims priority to patent application number 2007906117 filed in Australia on Nov. 6, 2007.

FIELD OF THE INVENTION

The present invention relates to an incendiary dispensing system particularly, although not exclusively, for use in airborne fire control procedures such as back-burning.

BACKGROUND OF THE INVENTION

Applicant developed an apparatus for initiating and dispensing an incendiary described in International Publication No. WO 2004/041365, the contents of which is incorporated herein by way of reference. However, by way of brief explanation, the apparatus for initiating and dispensing an incendiary comprises a feed mechanism for advancing a line of series connected incendiaries to a dispensing location; an injection device; and a cutter. The injection device injects a substance such as glycol into the incendiary as it is moved toward, but prior to reaching, the dispensing location. The glycol reacts exothermically with another substance such as potassium permanganate in the incendiary. The cutter cuts the incendiary into which the glycol has been injected. Thereafter, the feed mechanism advances the incendiary to the dispensing location where it is dispensed by action of gravity.

Typically, the apparatus is held within a housing that is subsequently attached to or installed in an aircraft such as a helicopter. A supply of incendiaries is held outside of the housing but fed into the housing through a feed shoot and loaded onto the apparatus. A glycol tank is also plumbed to the housing with internal pipes directing the glycol to the injecting mechanism.

The present invention arises from further development of the above mentioned apparatus having particular regard to the practicalities of use of the apparatus.

SUMMARY OF THE INVENTION

According to the present invention there is provided an incendiary dispensing system comprising:
- a casing that can be opened and closed, and having an aperture;
- a supply of incendiary capsules loaded in said casing and provided as at least one belt of series connected incendiary capsules;
- an apparatus for initiating and dispensing the incendiary capsule, the apparatus and casing arranged so that incendiary capsules initiated by the apparatus are dispensed from the casing through the aperture; and,
- a loading mechanism into which at least one capsule of the or each belt is initially held, the loading mechanism feeding the or each belt into the apparatus.

The loading mechanism may be configured to prevent withdrawal of a held belt.

The loading mechanism may be configured to hold the at least one capsule of each belt sequentially adjacent to the apparatus.

The loading mechanism may further comprise a bias device that biases the held capsules into the apparatus.

The loading mechanism may be arranged to hold the at least one capsule of each belt in a manner to form a stack of capsules.

In one embodiment, the bias device bears on the at least one capsule of a belt most distant the apparatus.

The supply of incendiary capsules may be provided as respective rotatable reels for each belt of capsule, wherein each reel has a respective axis of rotation.

It is further envisaged that the system may further comprise for each reel, two flaps that apply pressure to the belt held on that reel on opposite sides on the axis of rotation of the reel.

When the system comprises a plurality of reels, the reels are arranged in a line behind the apparatus. In this embodiment, the at least one capsules held by the loading mechanism are arranged in a same sequence as the reels, with the at least one capsule from a reel closest the apparatus being held closest to the apparatus and the at least one capsule from a reel most distant the apparatus being held distant the apparatus.

In one embodiment each belt or reel of capsules is provided in a separate box that can be loaded into and removed from the casing.

The system may further comprise a frame to which the apparatus and supply is coupled and wherein the frame is configured to sit in the casing so that an assembly comprising the frame, apparatus and supply can be loaded and unloaded as a single unit into and from the casing.

The casing may be made in an aerodynamic shape so as to provide minimal wind resistance when held on an outside of an aircraft.

The casing may be provided with a door to enable the apparatus and supply to be loaded into and unloaded from the casing.

The system may also comprise a coupling system to facilitate coupling of the casing to an outside of an aircraft.

The system may also comprise an automatic release mechanism to facilitate ejection or release of the casing from the aircraft.

The system may further comprise a container of a liquid which is injected into an incendiary by the apparatus, the liquid when injected causing an exothermic reaction with other contents of the incendiary, and wherein the container is held within the casing.

BRIEF DESCRIPTION OF THE DRAWINGS

Embodiments of the present invention will now be described by way of example only with reference to the accompanying drawings in which:

FIG. 6 is a representation of the incendiary dispensing system with its casing closed;

FIG. 7 is a schematic section view of a third embodiment of the incendiary dispensing system;

FIG. 8 is a schematic perspective view of the system depicted in FIG. 7; and,

FIG. 9 is a representation of the system shown in FIGS. 7 and 8 loaded on a skid of a helicopter and being loaded with a supply of incendiary capsules.

DETAILED DESCRIPTION OF PREFERRED EMBODIMENTS

Figure 1:
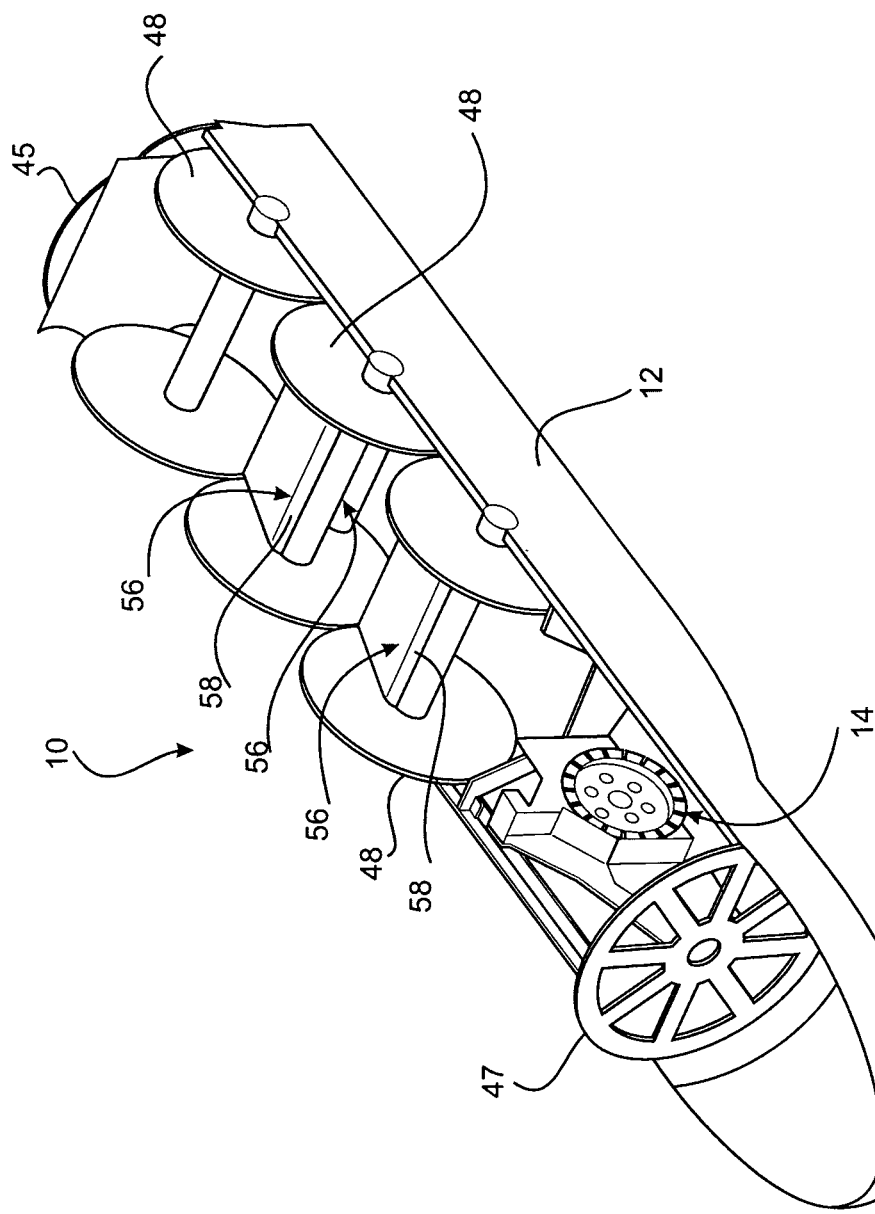
FIG. 1 is a schematic representation of the incendiary dispensing system with its casing open.
Figure 2:
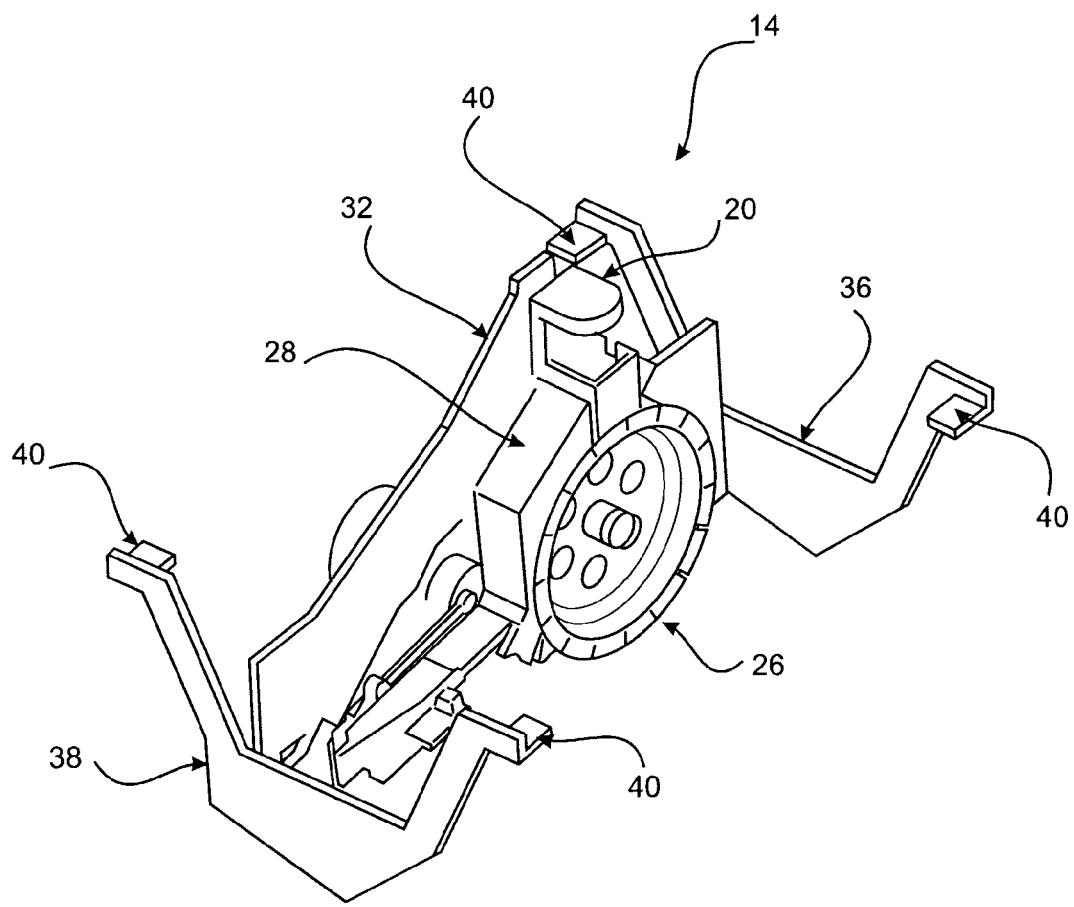
FIG. 2 is a representation of an apparatus for initiating and dispensing an incendiary incorporated in the incendiary dispensing system shown in FIG. 1.
Figure 3A:
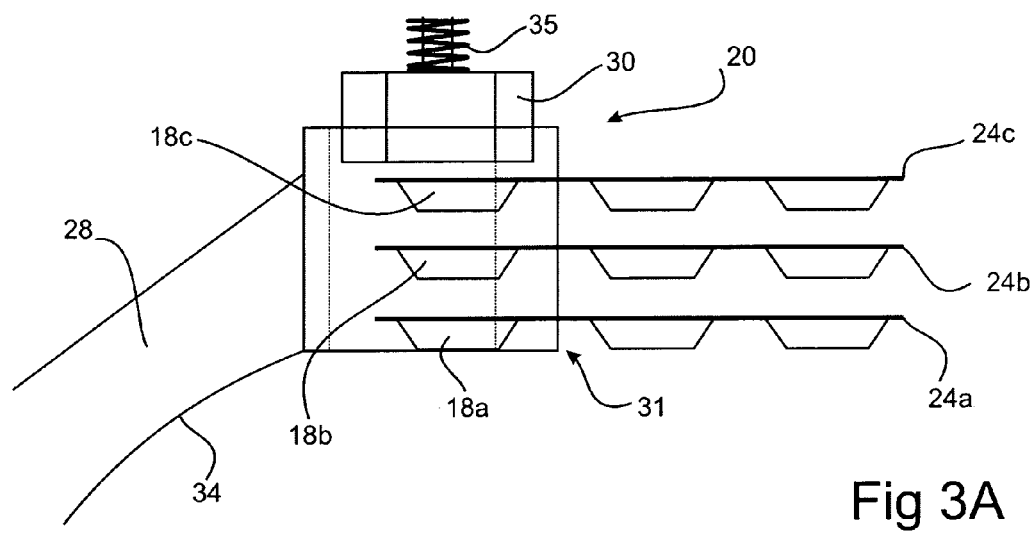
FIG. 3a is a side view of a loading mechanism incorporated in the system.
Figure 3B:
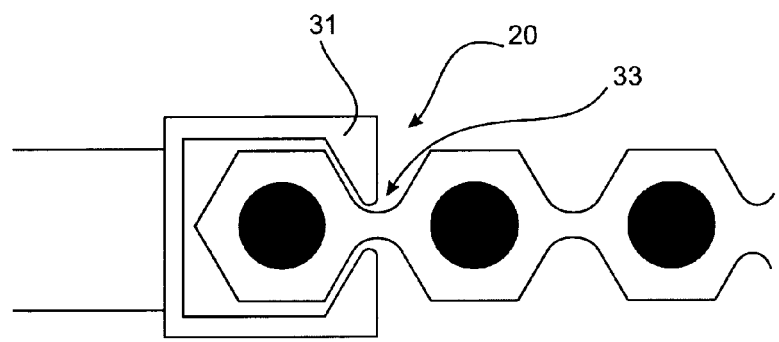
FIG. 3b is a plan view of the loading system.

As illustrated in the accompanying drawings, an embodiment of the incendiary dispensing system 10 comprises a casing or pod 12 (as shown in FIGS. 1 and 6); an apparatus 14 for initiating and dispensing an incendiary (shown in FIGS. 1, 2, 4 and 5); a supply 16 of incendiary capsules. 18 (see FIGS. 1, 4 and 5); and a loading mechanism 20 (FIGS. 2, 3a, 3b and 5). The casing 12 can be opened and closed and is provided with an aperture 22 (in FIG. 6). The apparatus 14 for initiating and dispensing incendiary capsules 18 is seated in the casing 12 and together with the casing 12 is arranged so that an incendiary capsule 18 initiated by the apparatus 14 is dispensed from the casing 12 through the aperture 22. The supply 16 is also loaded in the casing 12 and is provided with at least one belt 24 of series connected capsules 18. The loading mechanism 20 is initially loaded with at least one, but typically a first, capsule 18 from each belt 24 in supply 16. The loading mechanism 20 holds the first capsules in a sequentially adjacent manner to the apparatus. This enables the loading mechanism to sequentially load successive belts into the apparatus. The apparatus 14 is in substance the same as that described in the above referenced International Publication WO 2004/041365. The apparatus 14 comprises a wheel or carousel 26 that is provided on its outer circumferential surface with a plurality of receptacles for receiving individual capsules 18. The wheel or carousel 26 is rotated or indexed by a Geneva gear that in turn is driven by a motor (not shown). The apparatus 14 includes an injection system for injecting glycol into the capsules 18 and a cutter for cutting an injected capsule 18 similar to that described in the aforementioned International publication. The capsules 18 typically hold a quantity of potassium permanganate which, when in contact with glycol reacts exothermically. The injected and cut capsule drops from the wheel or carousel 26 and passes through a chute that leads to the aperture 22.

As previously mentioned loading mechanism 20 receives a first or leading capsule 18 of each belt 24 of capsules. This is shown most clearly in FIG. 3a where three belts 24a, 24b and 24c are depicted as engaged with the loading mechanism 20. The loading mechanism 20 comprises a magazine 31 in which first capsules 18a, 18b and 18c of the belts 24a, 24b and 24c are stacked. A piston 30 bears on the upper most belt 24c and is acted upon by a bias device in the form of spring 32 so as to bias the stack of capsules 18 onto the apparatus 14 and in particular into the recesses in the wheel 26. The magazine 31 is provided with a reduced width neck 33 which extends between the first and second capsules of any belt 24 to prevent withdrawal of the belt from the magazine 31. To load the magazine the piston 30 is pulled up against the bias of the spring 32 and the capsules 18a-18c fed in from the top of the magazine 31.

Figure 5:
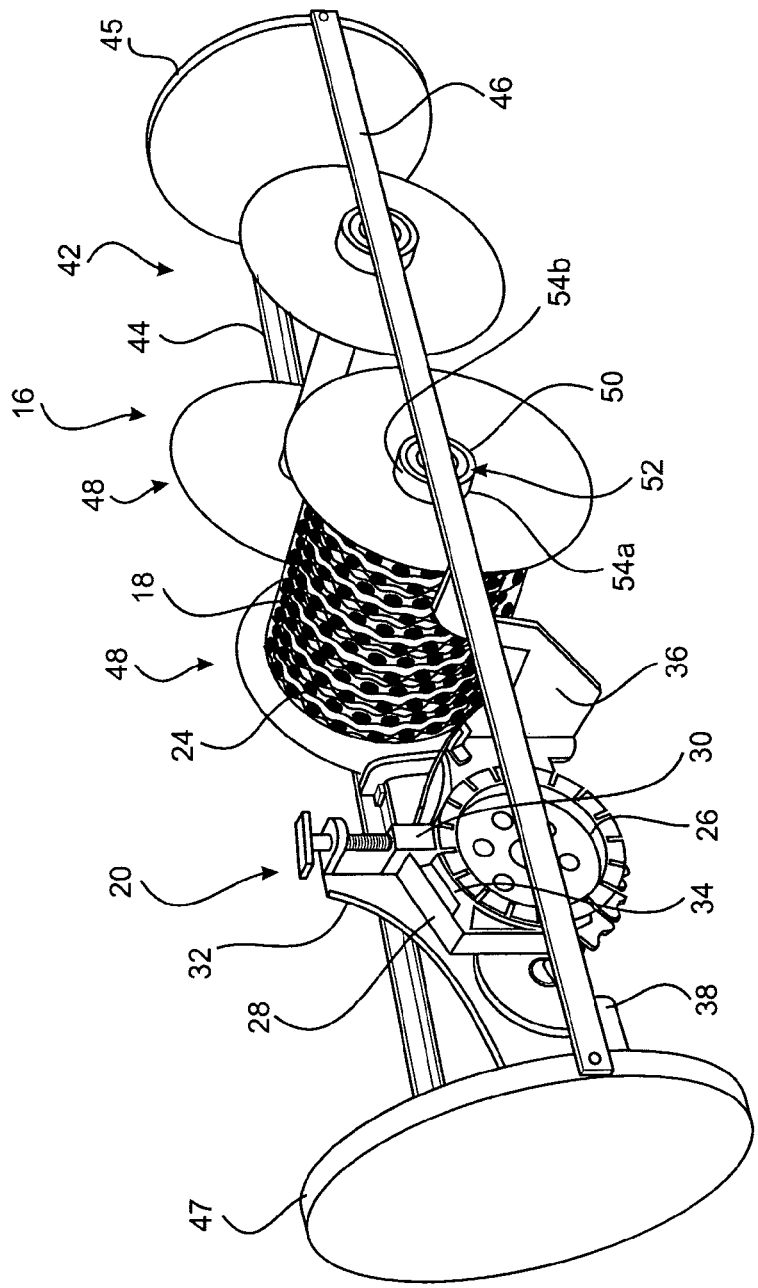
FIG. 5 is a schematic representation of a second embodiment of the incendiary dispensing system.

The loading mechanism 20 together with a guide arm 28 are attached to a side plate 32. The wheel 26 is also journaled on the side plate 32. The guide arm 28 has an inner surface 34 that extends about an approximate 90° sector of the wheel 26 immediately in advance of the loading mechanism 20. For example, as shown in FIG. 5 with the wheel 26 driven in an anticlockwise direction the guide arm 28 is disposed in front of the loading mechanism 20. The surface 34 is spaced from but close to the wheel 26 and assists in maintaining the capsules 18 in the recesses in the wheel 26 prior to injection with glycol.

Aft plate 36 and forward plate 38 are attached to the opposite ends of the side plate 32. The plates 36 and 38 are provided with respective lugs 40 that sit on a support frame 42. The support frame 42 comprises a pair of spaced apart parallel right angle members 44 and 46, a circular aft plate 45 and circular forward plate 47, which are attached to both of the angle member 44 and 46. The plates 36 and 38 allow the apparatus 14 to be suspended on the frame 42. The apparatus 14 then can be moved along the frame 42 to a required position and then fastened by way of fasteners passing through the lugs 40 and into the members 44 and 46. Alternately, clamps or clips can be used to retain the plates 36 and 38 and thus the apparatus 14 in place on the frame 42.

The supply 16 of the incendiary capsules 18 is provided by way of a number of reels 48 mounted on the frame 42. Each reel 48 has an axle 50 extending transversely on the frame 42 with the ends of each axle seated in respective bearings 52. Each bearing 52 is formed of two semicircular cups 54a, 54b (referred to in general as "cups 54") that can be separated and coupled together along a line parallel to the members 46. Thus by removing an upper one of the cups 54 of each bearing 52 a reel 48 can be loaded and unloaded from the frame 42. The plates 45 and 47 support the members 44 and 46 at a height within the casing 12 sufficient to ensure that the apparatus 14 and reels 48 are spaced from an inner surface of the casing 12.

A single belt 24 of capsules 18 is wound upon each reel 48. In the embodiments shown in FIGS. 1 and 4 the supply 16 is shown as comprising three reels 48, but in the embodiment shown in FIG. 5, the supply 16 comprises only two reels 48. Embodiments of the system 10 may include one, two or more reels 48.

When the magazine 31 of the loading mechanism 20 is initially loaded a first capsule from a reel 48 closest the apparatus 20 is loaded first in the magazine 31.

Then, the first capsule from the next reel 48 is loaded in the magazine 31 on top of the previously loaded capsule. As a result of this sequence of loading, the belt 24 on the reel 48 closest the apparatus 14 is first consumed, then the belt on the next reel 48 and so on.

Figure 4:
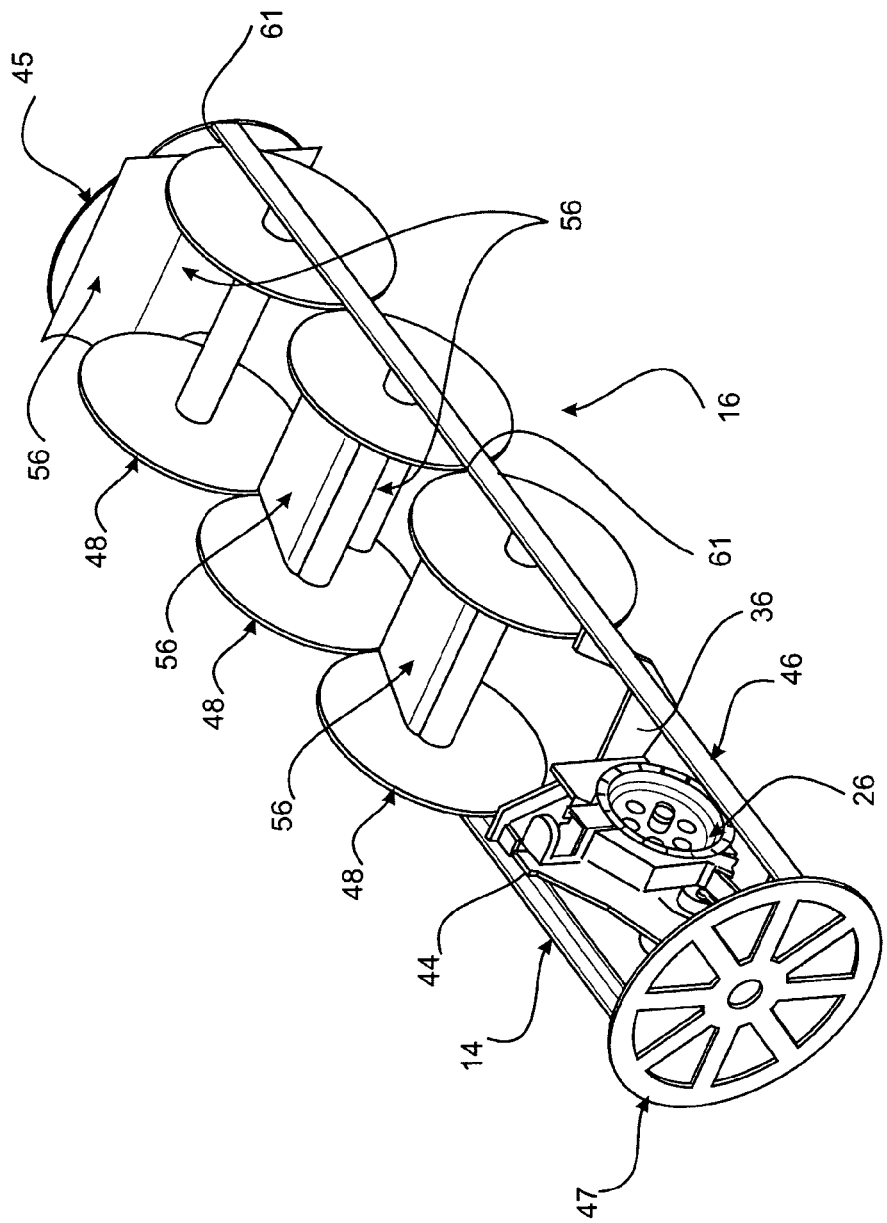
FIG. 4 is a schematic representation of the system outside of its casing.

As shown in FIGS. 1 and 4, two flaps or clam shells 56 are provided for each reel 48 and operate to apply pressure to the belt 24 of capsules 18 on each reel 48 from opposite sides of the axle 50 (and thus the axis of rotation) of that reel. The purpose of this is to minimize the likelihood of a belt 24 from unwinding unintentionally from its respective reel 48. The flaps 46 are also provided with smooth planar surfaces to act as a low friction interface between each of the reels 48 and further assist in preventing a belt 24 from one reel getting caught in another reel 48.

As seen in FIGS. 1 and 4, a forward edge of each flap 56 is provided with a curved lip 58. Opposite edges of each of flaps 56 in a pair of flaps are coupled together to form a longitudinal hinge 60. A hinge pin 61 of each hinge is supported on the members 44 and 46. A bias mechanism such as a spring (not shown) acts between the flaps 56 to bias them toward the axle of their respective reel 48.

The ensemble or assembly of the frame 42 with the apparatus 14 and the supply 16 (ie the reels 48 with belts 24) can be loaded and unloaded as a single unit into and out of the casing 12. A container of glycol (not shown) may also be loaded into the casing 12 in a space 62 forward of the plate 47. Similarly, a fire extinguisher system (not shown) may be loaded in the space 62 of the casing 12. The casing 12 is made of an aerodynamic shape akin to that of a missile and is provided with a coupling system to facilitate loading or attachment an outside of an aircraft, such as for example to the skids of a helicopter or under a wing or fuselage of a fixed wing light aircraft. The coupling system may for example comprise one or more hydraulic, pneumatic or electric clamps or grips that engage one or more struts or flanges or like structures on an outside of the casing. A digital display (not shown) may be provided on the casing 12 to display status information of the system 10. In addition the system 10 may be provided with an electronic controller and a remote control system to enable a pilot or copilot of a helicopter or light fixed wing aircraft to operate the system 10 in their normal seating position. Further, an automatic release system may be provided to eject or release the casing 12 from the helicopter or aircraft when airborne. This may be required for example in the (unlikely) event of a malfunction such as an incendiary jamming and igniting further incendiaries within the casing 12. The remote control system can also be used to vary the speed of ejection of the capsules 18.

FIGS. 7, 8 and 9 depict a further embodiment of the system 10A. In describing this embodiment, like reference numbers are used to denote features of the same or similar construction or same or similar function as that described in relation to the first embodiment but with the addition of the letter "A" after the reference number.

The system 10A shown in FIGS. 7-9 differs from the system 10 in the following manner. The casing or pod 12A of the system 10A is provided with curved nose 70 and behind the nose a main body portion 72 having a rectangular cross section as shown most clearly in FIG. 9 rather than a generally cylindrical body of the casing 12. This allows for the provision of a planar door 74 on a upper surface of the main body 72. The door 74 can be opened and closed to enable loading of the system 10A with incendiary capsules 18A. In a further variation the supply 16A of incendiary capsules for the system 10A comprises one or more boxes 76 of capsules 18A. The capsules 18A for each box 76 are provided as a belt 24A wound about a corresponding reel 48A. Each box is provided with an opening 78 in the form of a slot formed on an upper surface of each box along an upper edge closest the apparatus 14A.

Curved guides 80 (see FIG. 7) are provided between mutually adjacent box 76 near the opening 78 to minimize friction between the belts 24A and the boxes 76 and minimise the risk of entanglement or jamming. Each box 76 can be simply dropped in to the casing 12A by opening the door 74. This may provide a more convenient method of loading the system 10A in comparison to the system 10 where each individual reel is demountably coupled the frame 42.

The length of the main body 72 determines the number of boxes 76 of capsules that can be held at any one time. Thus to increase the capacity of the system 10a, one can simply increase the length of the body 72. In the event that the system 10 is loaded with fewer boxes 76 than a maximum carrying capacity, either a blank can be loaded behind the box or boxes 72 to retain the box or boxes 72 in place, or alternately the casing 12A may be provided with low upright dividing walls 82 (shown in FIG. 7) for retaining the boxes 72 in a required or preferred position.

FIG. 8 also depicts a supply 84 of glycol, and a fire extinguisher system 86 located adjacent the apparatus 14A in the housing 12A.

FIG. 9 depicts the system 10A mounted to a skid 90 of a helicopter 92.

Now that embodiments of the invention have been described in detail it will be apparent to those skilled in the relevant arts that numerous modifications and variations may be made without departing from the basic inventive concepts. For example, the loading mechanism 20 is illustrated and described as initially holding a first or leading capsule of each belt in a stack so as to sequentially feed each belt onto the apparatus 14. However in a variation, the loading mechanism may hold one or more capsules of each belt in a side by side arrangement rather than a stack. Further, the mechanism 20 may hold each belt individually rather than as a collective group.

All such modifications and variations together with others that would be obvious to persons of ordinary skill in the art are deemed to be within the scope of the present invention the nature of which is to be determined from the above description and the appended claims.

The invention claimed is:

1. An incendiary dispensing system arranged for airborne incendiary dispensing comprising:
   a casing that can be opened and closed, and having an aperture, the casing being configured in an elongated aerodynamic shape to provide minimal wind resistance when the casing is located on and attached to an outside of an aircraft, the casing enclosing a space capable of holding a supply of incendiary capsules comprising one or more wound belts of series-connected incendiary capsules;
   an apparatus for initiating and dispensing each incendiary capsule of a supply of incendiary capsules held in use in the enclosed space, the supply comprising respective rotatable reels for each belt of capsules, wherein each reel has a respective axis of rotation and each reel comprises two flaps that apply pressure to the belt held on that reel on opposite sides on the axis of rotation of the reel, the apparatus and casing arranged so that incendiary capsules initiated by the apparatus are dispensed from the casing through the aperture; and
   a loading mechanism into which at least one capsule of the or each belt is initially held in use, the loading mechanism for feeding the or each belt into the apparatus.

2. The system according to claim 1 wherein the loading mechanism is configured to prevent withdrawal of a held belt.

3. The system according to claim 1 wherein the loading mechanism is configured to hold the at least one capsule of each belt sequentially adjacent to the apparatus.

4. The system according to claim 1 wherein the loading mechanism comprises a bias device that biases the held capsules into the apparatus.

5. The system according to claim 4 wherein the bias device bears on the at least one capsule of a belt most distant the apparatus.

6. The system according to claim 1 wherein the loading mechanism is arranged to hold the at least one capsule of each belt in a manner to form a stack of capsules.

7. The system according to claim 1 wherein the loading mechanism is arranged to hold the at least one capsule of each belt in a side by side manner.

8. The system according to claim 1 wherein when the system comprises a plurality of reels, the reels are arranged in a line with the apparatus.

9. The system according to claim 8 wherein the loading mechanism is arranged to hold the at least one capsules in a same sequence as the reels in the line, with the at least one capsule from a reel closest the apparatus being held closest to the apparatus and the at least one capsule from a reel most distant the apparatus being held distant the apparatus in the loading mechanism.

10. The system according to claim 1 wherein each belt of capsules is provided in a separate box that can be loaded into and removed from the casing.

11. The system according to claim 1 comprising a frame to which the apparatus and supply is coupled and wherein the frame is configured to sit in the casing so that an assembly comprising the frame, apparatus and supply can be loaded and unloaded as a single unit into and from the casing.

12. The system according to claim 1 wherein the casing is provided with a door to enable the apparatus and supply to be loaded into and unloaded from the casing.

13. The system according to claim 1 comprising a coupling system to facilitate coupling of the casing to the outside of the aircraft.

14. The system according to claim 13 comprising an automatic release mechanism to facilitate ejection or release of the casing from the aircraft.

15. An incendiary dispensing system comprising:
   a casing that can be opened and closed, and having an aperture;
   a supply of incendiary capsules loaded in said casing and provided as at least one belt of series-connected incendiary capsules, each belt being wound on a respective reel, wherein each reel has a respective axis of rotation and two flaps that apply pressure to the belt held on that reel on opposite sides on the axis of rotation of the reel;
   an apparatus for initiating and dispensing each incendiary capsule, the apparatus and casing arranged so that incendiary capsules initiated by the apparatus are dispensed from the casing through the aperture; and
   a loading mechanism into which at least one capsule of the or each belt is initially held in use, the loading mechanism for feeding the or each belt into the apparatus.

16. The system according to claim 15 wherein when the system comprises a plurality of reels, the reels are arranged in a line with the apparatus.

17. The system according to claim 15 wherein each belt of capsules is provided in a separate box that can be loaded into and removed from the casing.

18. The system according to claim 15 comprising a frame to which the apparatus and supply is coupled and wherein the frame is configured to sit in the casing so that an assembly comprising the frame, apparatus and supply can be loaded and unloaded as a single unit into and from the casing.

19. The system according to claim 15 wherein the casing is made in an aerodynamic shape so as to provide minimal wind resistance when held on an outside of an aircraft.

20. An incendiary dispensing system comprising:
   a casing that can be opened and closed, and having an aperture;
   a supply of incendiary capsules loaded in said casing and provided as at least one belt of series-connected incendiary capsules, each belt being wound on a respective reel wherein each reel has a respective axis of rotation;
   an apparatus for initiating and dispensing each incendiary capsule, the apparatus and casing arranged so that incendiary capsules initiated by the apparatus are dispensed from the casing through the aperture;
   a loading mechanism into which at least one capsule of the at least one belt is initially held in use, the loading mechanism for feeding the at least one belt into the apparatus; and
   a frame to which the apparatus and supply is coupled and wherein the frame is configured to sit in the casing so that an assembly comprising the frame, apparatus and supply can be loaded and unloaded as a single unit into and from the casing.

21. The system according to claim 20 wherein when the system comprises a plurality of reels, the reels are arranged in a line with the apparatus.

22. The system according to claim 21 wherein the loading mechanism is arranged to hold the at least one capsules in a same sequence as the reels in the line, with the at least one capsule from a reel closest the apparatus being held closest to the apparatus and the at least one capsule from a reel most distant the apparatus being held distant the apparatus in the loading mechanism.

23. The system according to claim 20 wherein each belt of capsules is provided in a separate box that can be loaded into and removed from the casing.

24. The system according to claim 23 wherein the casing is made in an aerodynamic shape so as to provide minimal wind resistance when held on an outside of an aircraft.

25. An incendiary dispensing system arranged for airborne incendiary dispensing comprising:
   a casing that can be opened and closed, and having an aperture, the casing being configured in an elongated aerodynamic shape to provide minimal wind resistance when the casing is located on and attached to an outside of an aircraft, the casing enclosing a space capable of holding a supply of incendiary capsules comprising one or more wound belts of series-connected incendiary capsules;
   an apparatus for initiating and dispensing each incendiary capsule of a supply of incendiary capsules held in use in the enclosed space, the supply comprising respective rotatable reels for each belt of capsules, wherein each reel has a respective axis of rotation, the apparatus and casing arranged so that incendiary capsules initiated by the apparatus are dispensed from the casing through the aperture;
   a frame to which the apparatus and supply is coupled and wherein the frame is configured to sit in the casing so that an assembly comprising the frame, apparatus and supply can be loaded and unloaded as a single unit into and from the casing; and
   a loading mechanism into which at least one capsule of the or each belt is initially held in use, the loading mechanism for feeding the or each belt into the apparatus.

26. The system according to claim 25 wherein the loading mechanism is configured to prevent withdrawal of a held belt.

27. The system according to claim 25 wherein the loading mechanism is configured to hold the at least one capsule of each belt sequentially adjacent to the apparatus.

28. The system according to claim 25 wherein the loading mechanism comprises a bias device that biases the held capsules into the apparatus.

* * * * *

UNITED STATES PATENT AND TRADEMARK OFFICE
CERTIFICATE OF CORRECTION

| | | |
|---|---|---|
| PATENT NO. | : 8,601,929 B2 | Page 1 of 1 |
| APPLICATION NO. | : 12/741699 | |
| DATED | : December 10, 2013 | |
| INVENTOR(S) | : Robert Andrew Stevenson | |

It is certified that error appears in the above-identified patent and that said Letters Patent is hereby corrected as shown below:

On the Title Page, Item (56), Column 2, Other Publications, line 2: please delete "1008" and insert therefor -- 2008 --

Signed and Sealed this
Twenty-ninth Day of April, 2014

Michelle K. Lee
*Deputy Director of the United States Patent and Trademark Office*